United States Patent [19]

Anderson et al.

[11] Patent Number: 4,703,174

[45] Date of Patent: Oct. 27, 1987

[54] FIBEROPTIC TEMPERATURE/PRESSURE SENSOR SYSTEM

[75] Inventors: John C. Anderson, Houston; Morris J. Davies, Stafford; Archie C. Lamb, Houston, all of Tex.

[73] Assignee: Fiberdynamics, Inc., Houston, Tex.

[21] Appl. No.: 891,603

[22] Filed: Aug. 1, 1986

Related U.S. Application Data

[62] Division of Ser. No. 585,430, Mar. 2, 1984, Pat. No. 4,672,199.

[51] Int. Cl.⁴ .................................................. H01J 5/16
[52] U.S. Cl. .............................. 250/227; 250/231 P; 73/705; 73/745
[58] Field of Search ............... 250/227, 231 R, 231 P; 73/705, 744, 745

[56] References Cited

U.S. PATENT DOCUMENTS

| | | | |
|---|---|---|---|
| 3,503,116 | 3/1970 | Strack | 73/705 |
| 3,831,137 | 8/1974 | Cuomo | 250/227 |
| 4,322,978 | 4/1982 | Fromm | 73/705 |
| 4,358,960 | 11/1982 | Porter | 250/227 |
| 4,509,370 | 4/1985 | Hirschfeld | 250/227 |
| 4,588,886 | 5/1986 | Snider | 250/231 P |

Primary Examiner—David C. Nelms
Attorney, Agent, or Firm—Dula, Sheilds & Egbert

[57] ABSTRACT

A fiberoptic sensing system comprising a light source, a sensor responsive to external stimulus, an optical fiber connected to the light source and the sensor, a detector arranged to receive light from the optical fiber, and output electronics electrically connected to the detector. The sensor includes a reflective surface arranged so as to reflect light from the optical fiber. This reflective surface is movable relative to the optical fiber. The light source comprises a light-emitting diode and a reference diode electrically connected to the source of electrical energy and to the light-emitting diode. A beamsplitter is disposed about the light source, the optical fiber, and the photodetector. The detector includes a transimpedance amplifier and a RMS to DC converter. The output electronics includes a gain control and a offset control. The sensor may be either a temperature sensor or a pressure sensor.

3 Claims, 3 Drawing Figures

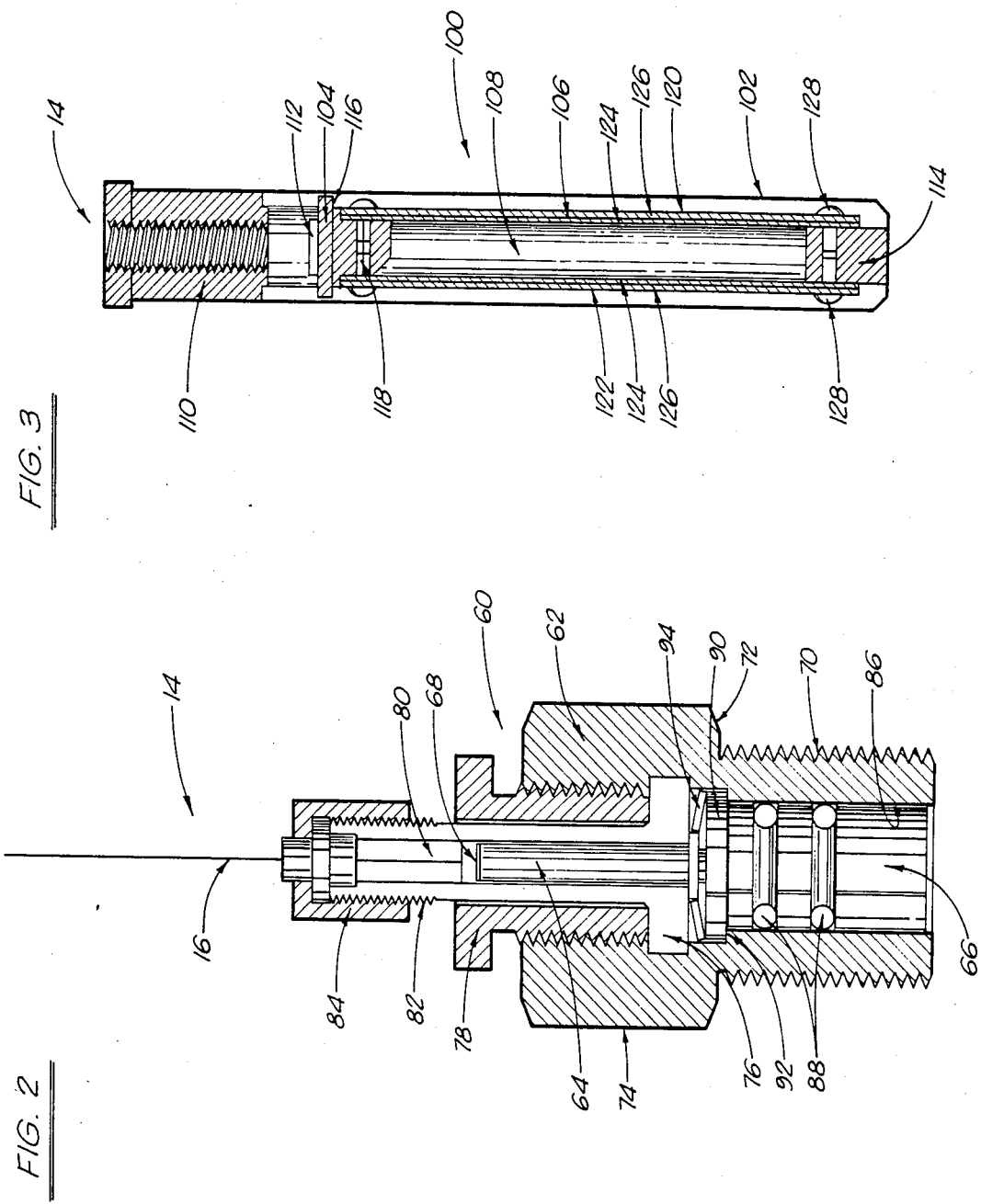

FIBEROPTIC TEMPERATURE/PRESSURE SENSOR SYSTEM

This is a divisional of co-pending application Ser. No. 585,430 filed on Mar. 2, 1984, now U.S. Pat. No. 4,672,199.

TECHNICAL FIELD

The present invention relates to instrumentation for detecting temperature and pressure. More particularly, the present invention relates to fiberoptic techniques for monitoring temperature and pressure conditions in a remote location.

BACKGROUND ART

Fiberoptics is the branch of physics concerned with the propagation of light that enters a thread or rod of transparent material at one end and is totally reflected back inward from the wall, thereby being transmitted within the fiber from one end to the other. Fiberoptics is widely applied in medical practice to observe the human body internally. Fiberoptic fibers have also been used to transmit light signals carrying information from both electronic and optical sensors.

The accurate measurement of temperature is important in many chemical processes to avoid harm to materials and equipment resulting from temperatures outside a specified range. Its determination is also necessary in situations in which it is a needed variable in the computation of properties, such as pressure, viscosity, or density. Methods of sensing temperatures depend upon the measurement of the changes caused by temperature. Many devices, such as the familiar glass-stem thermometer, measure the change in volume of a substance, such as mercury, caused by a change in temperature. Thermistors are devices that measure temperature by the change it causes in their electrical resistance. Temperature may be inferred by measuring the intensity of the total radiation emitted, as radiation pyrometers do, or by observing changes in color or shape of certain materials. These devices exist in such multiplicity to meet differing requirements of size, accuracy, range, and ability to withstand the testing environment.

One of the most versatile and widely used of these devices is the thermocouple. It operates on the principle that heat imparted to the junction of two different metals or alloys causes a voltage that varies with the amount of heat applied. The device consists of two wires of different metal, fused together at one end to form a measuring junction. The free ends are connected to a measuring instrument, which converts the voltage at the thermocouple junction into a measurement of the temperature, the two quantities being directly proportional.

Pressure, like temperature, is a variable that must be measured accurately in industry, particularly in the chemical industry. Determination of pressure is vital, for instance, in the control of hydrogenation (addition of hydrogen) and distillation in petroleum processing. Again, like temperature, pressure is a variable needed in the calculation of other properties. Pressure-measuring devices vary with the range over which they are meant to be used. In the vacuum range, gas pressure is detected by measuring the current generated due to ionization of the gas or by measuring the thermal conductivity of the rarified gas. Pressures in this region are also calculated by compressing a known volume of the gas until it reaches a fixed pressure. When the new volume is measured, the original pressure can be computed by use of Boyle's Law, which states that the product of the original volume and original pressure is equal to the product of the new volume and new pressure.

In the atmospheric pressure range and above, elastic pressure elements are widely used; they measure the expansion caused by pressure. While some devices measure the expansion of a diaphragm or a bellows, the most commonly used industrial sensor is the so-called Bourdon tube consisting of a tube in the form of a 250° arc. The process pressure is connected to the fixed socket end of the tube, while the tip end is sealed and connected via a series of links and gears to a pointer. Because of the difference between its inside and outside radii, the Bourdon tube tends to straighten when pressure is applied. The resulting motion of the sealed tip is a function of this pressure, and thus, the position of the pointer yields a measure of the process pressure.

A device that has many applications in this pressure range is the strain gauge, which is based upon the fact that metallic conductors subjected to strain exhibited corresponding change in electrical resistance. There are many types of strain gauge, but all are constructed so that the process pressure causes a strain, and thus a change is electrical resistance, which is measured for a visual display. In one example, the process pressure is applied to a flat diaphragm. The strains resulting from the diaphragm deflection cause changes in the resistance of four strain elements bonded directly to the underside of the diaphragm. This change in resistance is measured as an indication of process pressure.

In many circumstances, particularly in the dangerous environment of chemical processing industries, it is necessary to measure pressure and temperature while avoiding any potential ignition of volatile gases in the area. Whenever electricity is directly applied in the measurement of temperature and pressure in such applications, there is an inherent risk that a short circuit or other electrical malfunction may occur that could ignite a dangerous mixture.

While fiberoptics have been used in the past for the measurement of temperature and pressure, these techniques have required the use of complicated bundles of optical fibers and electronics associated with those optical fibers. These arrangements have been costly, logistically difficult, unduly complicated, and generally unreliable. The present invention is believed to be the first application of a single optical fiber approach to the measurement of temperature and pressure.

It is an object of the present invention to provide an inherently safe technique for the measurement of temperature and pressure.

It is another object of the present invention to provide a fiberoptic sensor system that produces an analog output relative to the effect of temperature of pressure upon a sensor.

It is still another object of the present invention to provide a fiberoptic sensing system that stabilizes the source of light that is directed toward the optical fiber within such a system.

It is still another object of the present invention to provide a fiberoptic sensing system for the measurement of temperature of pressure that utilizes a single optical fiber for the transmission of light information to and from the sensing device.

These and other objects and advantages of the present invention will become apparent from a reading of the attached specification and appended claims.

DISCLOSURE OF THE INVENTION

The present invention is a fiberoptic sensing system comprising a light source; a sensor responsive to an external stimulus; an optical fiber for transmitting light from the light source to the sensor; a photodetector arranged so as to receive light from the optical fiber; and output circuitry electrically connected to the photodetector. In this invention, the sensor includes a reflective surface for reflecting light from the optical fiber. This reflective surface is movable relative to the optical fiber in response to the external stimulus. The photodetector is responsive to the power of light emitted by the optical fiber. The output circuitry produces a signal relative to the light as received by the photodetector.

The light source of the present invention comprises a light-emitting diode, and a reference diode electrically connected to the source of electrical energy for the light-emitting diode and to the light-emitting diode. This reference diode serves to stabilize current acting upon the light-emitting diode. The reference diode is made up of a Zener diode circuit, an operational amplifier electrically connected to the Zener diode, and a potentiometer electrically connected to the Zener diode, the operation amplifier, and the light-emitting diode. The potentiometer is used for setting the power level to the light-emitting diode.

In one embodiment, the sensor is a temperature sensor. This temperature sensor comprises a housing, a carrier arranged within the housing, and at least one bimetallic strip connected to the carrier at one end and anchored to the housing at the other end. The bimetallic strip allows the carrier to move longitudinally within the housing in response to changes in temperature affecting the bimetallic strip. The carrier has a reflective surface affixed thereto. This temperature sensor also has a suitable fiberoptic connector arranged about one end of the housing such that the optical fiber is positioned in parallel relationship to the reflective surface on the carrier.

In the other embodiment, the sensor of the present invention is a pressure sensor. This pressure sensor comprises a body, a carrier element arranged within the body, and a pressure-responsive member connected to the carrier element. The carrier element of the present invention has a reflective surface affixed thereto. The pressure-responsive member is movable within the body in response to pressure acting on the member. The pressure-responsive member is a piston disposed within a cylindrical cavity of the body. The piston is arranged to move longitudinally within the body in response to pressure acting on the piston. The pressure sensor of the present invention further includes a Belleville spring disposed within the body and juxtaposed against one end of the piston. This Belleville spring exerts a desired amount of resistance against the longitudinal movement of the piston. As with the temperature sensor, the pressure sensor of the present invention has a suitable fiberoptic connector such that the optical fiber can be positioned in parallel relationship to the reflective surface.

The optical fiber of the present invention comprises a single optical pathway from the light source to the sensor. This includes a beamsplitter disposed generally about the light source, one end of the optical fiber, and the photodetector. The beamsplitter passes light from the light source to the optical fiber and passes light from the optical fiber to the photodetector.

The photodetector is positioned relative to the optical fiber so as to be electrically responsive to light emitted by the optical fiber for producing a current relative to the power of the light from the optical fiber. This photodetector further comprises a transconductance amplifier electrically connected to the photodetector for converting the current from the photodetector into a voltage, and a RMS to DC converter electrically connected to the transconductance amplifier for producing a direct current signal proportional to the voltage.

The output circuitry of the present invention includes a gain control electrically connected to the photodetector for providing a full scale setting with respect to the signal produced by the photodetector. The output circuitry also includes suitable offset control circuitry that is electrically connected to the photodetector for providing an adjustable zero setting with respect to the signal produced by the photodetector.

BRIEF DESCRIPTION OF THE DRAWINGS

FIG. 2 is a cross-sectional view in side elevation of the pressure sensor in accordance with the present invention.

FIG. 3 is a cross-sectional view in side elevation of the temperature sensor in accordance with the present invention.

BEST MODE FOR CARRYING OUT THE INVENTION

Figure 1:
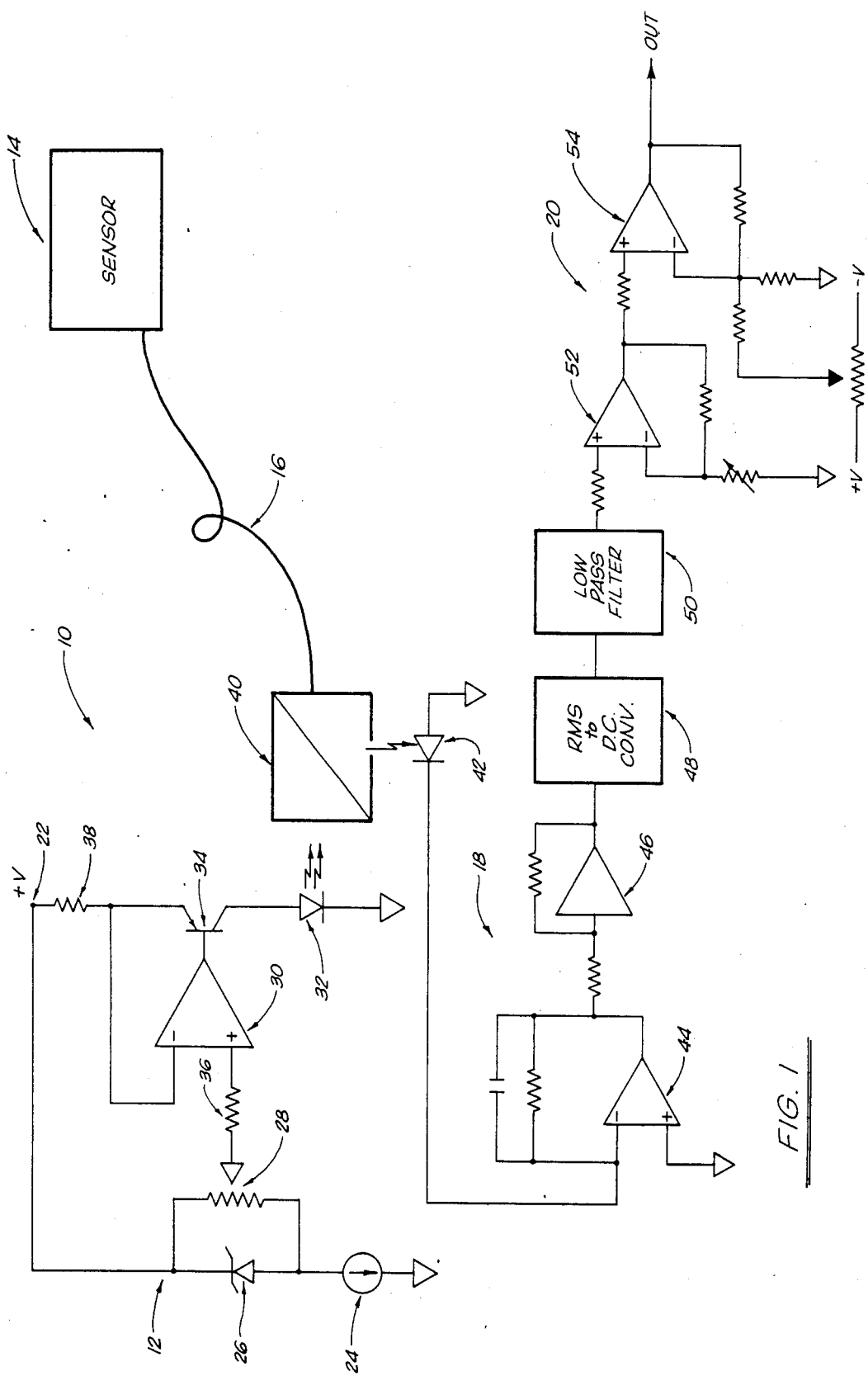
FIG. 1 is a schematical representation of the fiberoptic temperature/pressure sensor system in accordance with the present invention.

Referring to FIG. 1, there is shown at 10 the fiberoptic temperature/pressure sensor system in accordance with the present invention. The fiberoptic temperature/pressure sensor system 10 comprises a light source 12, sensor means 14, fiberoptics 16, detection circuitry 18, and output circuitry 20.

The light source 12 of the present invention offers a stabilized approach to the introduction of light into the fiberoptics. Light source 12 is powered by a voltage source 22. In order to offer the most stable light source, the light source 12 comprises semi-precision current source 24, reference (Zener) diode 26, potentiometer 28, operational amplifier 30, and light-emitting diode 32. The semi-precision current source 24 is a well-known, off-the-shelf component. The reference diode 26 employs a Zener diode and has a temperature compensation circuit built in. This means that the temperature drift of the reference diode 26 is almost zero. The potentiometer 28 is included within light source 12 so as to vary the power emitted by the light-emitting diode 32. In keeping with the proper design of this light source so as to achieve maximum stability, the potentiometer should have a very low temperature coefficient. The operational amplifier 30 is incorporated into this design so as to stabilize the voltage across the resistor. Also, since the op-amp 30 is enclosed around the transistor, the temperature drift about the transistor is zero since it is compensated by the op-amp 30. In addition, resistors 36 and 38 should be selected so as to have a zero temperature coefficient. Each of these elements interact within light source 12 so as to produce an extremely stable current acting on LED 32. The stability of the light from LED 32 is a critical design factor of the present invention. The stability of the light from LED 32 allows the rest of the system to properly make an analog measurement of the temperature/pressure characteristics sensed by sensor 14. In addition, such light stability enhances the accuracy and repeatability of the measurements of the present invention.

Sensor 14 may be either a pressure sensor (as seen in FIG. 2) or a temperature sensor (as illustrated in FIG. 3). The major requirement of sensor 14 is that it includes a reflective surface for reflecting light from the fiberoptics 16. This reflective surface should be movable in response to an external stimulus, such as a change of temperature or pressure. In this manner, the light emitted by light-emitting diode 32 into fiberoptics 16 may be reflected back into the fiberoptics. A more complete description of the temperature and pressure sensors that make up sensor 14 will be provided hereinafter.

Fiberoptics 16 is a single optical path extending from beamsplitter 40 to sensor 14. Optical fiber 16 is a type of transmission media that allows light to be transmitted long distances and around corners with little loss without interference from other light sources. Optical fiber 16 is a very thin tube of quartz, glass, or plastic which is designed to transmit a beam of light from one end to the other by essentially reflecting it from side to side as it travels down the fiber. In accordance with the present invention, fiberoptics 16 comprise a single optical fiber pathway. One end of fiberoptics 16 is coupled to beamsplitter 40 and arranged so as to receive light from LED 32. The light from LED 32 will travel along optical fiber 16 to its other end within sensor 14. Optical fiber 16 may have a length as long as several kilometers. This maximizes the distance between the electrical circuitry of the present invention and the potentially hazardous environment of sensor 14.

Beamsplitter 40 includes a housing that contains the beamsplitter and receives the LED 32, the optical fiber 16, and the detector components 18 of the present invention. Specifically, beamsplitter 40 is an optical arrangement that reflects part of the beam of light and transmits part of that beam of light. The fiberoptics 16 are arranged such that the optical fiber receives the light as transmitted by LED 32. Photodetector 42 is also connected to beamsplitter 40. In the preferred embodiment of this invention, these components are arranged such that light will be transmissive therebetween. In other words, light from LED 32 should pass to the beamsplitter 40 and be received by fiberoptics 16. The light returning through fiberoptics 16 from sensor 14 is reflected off beamsplitter 40 and is received by photodetector 42.

Detector circuitry 18 is comprised of photodetector 42, transconductance amplifier 44, voltage amplifier 46, RMS to DC converter 48, and low pass filter 50. Photodetector 42 receives the light transmitted from sensor 14 by fiberoptics 16. Photodetector 42 converts this light input into an electrical output. In this arrangement, photodetector 42 transmits an AC signal to transconductance amplifier 44. Transconductance amplifier 44 is electrically connected to photodetector 42 and converts the current from photodetector 42 into a voltage. This voltage is a function of the power of light received by photodetector 42. In this manner, as more light is reflected by sensor 14 into optical fiber 16, the greater amount of voltage will be transmitted by the transconductance amplifier 44. Voltage amplifier 46 is electrically connected to transconductance amplifier 44. Voltage amplifier 46 elevates the voltage produced by the transconductance amplifier 44 into a level that is suitable for working with. RMS to DC converter 48 converts the signal from voltage amplifier 46 into a DC signal proportional to the power of light that hit photodetector 42. As used in the present invention, this DC converter produces an observable indication of the level of power striking photodetector 42. As such, this allows the present invention to make an accurate analog measurement of temperature, pressure, or any other analog quantity. The use of this circuit becomes possible under the present invention because of the stability of the light source 12, as described hereinbefore. Low pass filter 50 receives the signal from RMS to DC converter 48 and removes electrical disturbances that are not part of the desired signal from photodetector 42.

The output circuitry 20 of the present invention comprises gain adjustment circuitry 52 and offset circuitry 54. Gain circuitry 52 provides a full scale setting relative to the signal produced by the detector circuitry 18. The offset circuitry 54 gives an adjustable zero setting and span with respect to the signal of the detection circuitry 18. Gain circuitry 52 and offset circuitry 54 are electrically connected together and pass an output that may be transferred to instrumentation external of the present system. This instrumentation could produce a humanly perceivable readout of the quantity that is being measured by sensor 14. For example, the output of the present invention could be transmitted to a computer external of the system. The computer could monitor the quantity being measured by sensor 14.

FIG. 2 shows the pressure sensor 60 in accordance with the present invention. Pressure sensor 60 comprises body 62, carrier element 64, and pressure responsive member 66. Carrier element 64 is integrally affixed to pressure responsive member 66. A reflective surface 68 is affixed to the top of carrier element 64.

Body 62 has a male threaded section 70 at its lower end. Threaded section 70 allows pressure sensor 60 to be inserted into a pipeline or tank, or other area desired to be measured. A shoulder 72 extends from the top portion of this threaded area 70. Body 62 has a generally cylindrical outer surface 74 located generally above threaded section 70. Body 62 also includes a support member 76 that is affixed to the interior of body 62 by bolt 78. Bolt 78 is connected to the interior of cylindrical section 74 in a threaded arrangement. Support member 76 is maintained in proper position by the proper tightening of bolt 78 within the interior of threaded section of the body 62. Support member 76 has a generally cylindrical internal cavity 80 that receives the carrier element 64 and reflective surface 68. Support member 76 has a threaded upper section 82. Threaded section 82 receives fiberoptic coupling element 84.

Fiberoptic coupling 84, along with fiberoptics 16, is inserted into the interior cavity 80 of support member 76 such that the optical fiber 16 has its light-emitting end maintained in a generally face-to-face relationship with reflective surface 68.

Carrier element 64 is generally cylindrical in configuration and fits within the interior cavity 80 of support element 76. Carrier element 64 is arranged so as to move longitudinally within the interior cavity 80. The movement of carrier element 64 is initiated and maintained by the movement of pressure responsive member 66.

Pressure responsive member 66 is a piston that is fitted into the cylindrical cavity 86 corresponding to threaded section 70 of body 62. Piston 66 has a generally cylindrical surface that fits within cylindrical cavity 86. Piston 66 is maintained within cylindrical cavity 86 in a fluid-tight arrangement through the use of O-rings 88 that are inserted into grooves about piston 66. At its upper end, piston 66 has a cylindrical section 90 of greater diameter than the main portion of piston 66. This greater diameter portion 90 is designed so as to fit against shoulders 92 formed within the interior of body 62. Carrier element 64 is affixed to, or integrated into, the top of greater diameter section 90. In this arrangement, any movement of piston 66 will result in a corresponding movement of carrier element 64 and reflective surface 68. A Belleville spring 94 is disposed between the bottom end of support member 76 and the top of greater diameter section 90 of piston 66. Carrier element 64 passes through the opening on the interior of Belleville spring 94. Belleville spring 94 is disposed in such a position so as to offer a desired amount of resistance to the movement of piston 66 within cavity 86. The amount of resistance of Belleville spring 94 can be changed by varying the thickness, the material, or the angle of inclination of the sides of the spring.

As used, pressure sensor 60 will change the intensity of the light reflected by reflective surface 68 in correspondence to the movement of piston 66. This change in reflectance (and power of light reflected) will correspond and correlate with the pressure acting on pressure responsive member 66.

FIG. 3 shows the temperature sensor 100 in accordance with the preferred embodiment of the present invention. Temperature sensor 100 comprises a housing 102, a carrier 104, and heat responsive members 106. Housing 102 is a generally cylindrical member having a generally cylindrical internal cavity 108. At its upper end, housing 102 includes a fiberoptic connector 110. Fiberoptic connector 110 is of the type to receive one end of the optical fiber 16. This connector is designed to position the optical fiber 16 such that the end of the optical fiber 16 is in face-to-face relationship with the reflective surface 112 affixed to carrier 104. At its lower end, housing 102 includes an anchor portion 114. Anchor portion 114 has a bore extending therethrough and transverse to the longitudinal axis of housing 102. This bore is of the type to receive suitable screws, threaded bolts, or other types of connection arrangements.

Carrier 104 has a generally cylindrical section 116. On top of this cylindrical section 116 is the reflective surface 112. Reflective surface 112 may be integrated onto, affixed to, or otherwise attached to cylindrical section 116 of carrier 104. Carrier 103 also has an attachment section 118 extending beneath cylindrical section 116. Attachment section 118 also has a suitable bore extending therethrough for receiving an end of temperature sensitive member 106. As used within the concept of the present invention, carrier 104 is capable of free movement within internal cavity 108 of housing 102.

Temperature sensitive member 106 comprises a pair of bimetallic strips 120 and 122. Each of these bimetallic strips is comprised of an inner strip 124 and an outer strip 126. The inner strip 124 and the outer strip 126 are affixed to each other in face-to-face relationship. The inner strip 124 has a higher coefficient of expansion than outer strip 126. One end of bimetallic strips 120 and 122 is affixed to anchor 114 by pins 128. The other end of bimetallic strips 120 and 122 is affixed to attachment section 11B of carrier 104. As used herein, the bimetallic strips 120 and 122 are arranged such that the metal with the higher coefficient of expansion comprises the inner strips.

The temperature sensor 100 of the present invention will cause relative movement of reflective surface 122 with respect to the end of the fiberoptics 16. As temperature sensor 100 is exposed to heat, bimetallic strips 120 and 122 will bow inward. This is caused by the fact that the inner strips 124 will expand while the outer strips 126 resist expansion. The bowing of strips 120 and 122 will cause carrier 104 to move farther away from the optical fiber 16 within connector section 110. As carrier 104 moves farther away from the end of the optical fiber, less light is reflected back into the optical fiber from reflective surface 112. In this manner, temperature can be measured by the change in reflectance of light back into the optical fiber 16.

In operation, the present invention, in its embodiments, offers an analog measurement of environmental factors affecting either the pressure sensor 60 or the temperature sensor 100 of the present invention. Light source 12 of the present invention is a stabilized light source. This means that light-emitting diode 32 will emit a temperature stabilized, constant light output into fiberoptics 16. When the reflective surface of the pressure or temperature sensors is near to the end of the optical fiber, a large amount of this light is reflected back into the end of the optical fiber. This light will exert a certain amount of power onto photodetector 42. As described herein previously, photodetector 42 will transmit a current signal to the transconductance amplifier 44. Transconductance amplifier 44 will create a voltage that is a function of the power of light hitting photodetector 42. As the light passes to the RMS to DC converter, it is changed to a DC signal proportional to the power of light striking the photodetector 42. This signal, through proper adjustments of gain and offset, can be read out as an indication of either pressure or temperature affecting sensor 14.

As the reflective surface is moved farther and farther away from the end of the optical fiber, less light is reflected back into the optical fiber and less light affects photodetector 42. As such, the signal will be in proportion to the amount of light striking the photodetector and thus, proportional to the amount of change of either temperature of pressure acting on sensor 14. In this manner, an accurate analog measurement of either temperature or pressure can be accomplished by the electronics of the present invention.

It should be noted herein that the main problem with fiberoptic sensors is temperature stability. Through the complicated arrangement of elements associated with light source 12, the current to the light-emitting diode is stabilized with respect to temperature. As a result, the light emitted by the light-emitting diode is also stable. Since a precision, stabilized light source is present in the present invention, the photodetector and associated electronics can present an accurate analog measurement of environmental factors affecting sensor 14. The RMS to DC converter 48 offers greater efficiency, greater linearity, a controllable speed, and a true conversion of power not found hereinbefore in the prior art of temperature and pressure sensing fiberoptics. Since alternating current is difficult to work with in producing an analog output, the conversion to DC greatly facilitates this analog measurement.

The output circuitry of the present invention affords the user of the present invention the ability to adjust gain and offset. Thus, the instrumentation of the present invention can be adapted to varying temperature levels, pressure levels, or other factors affecting the sensor. The output can be further coupled to instruments that can provide a humanly perceivable readout of the temperature and pressure affecting the sensor. Additionally, this output could be interconnected with a computer for providing a control on the system being monitored and observed.

By employing fiberoptics to the measurement of temperature and pressure, the present invention offers an inherently safe method of such measurement. Since the electrical components of the present invention are far removed from the hazardous environment or otherwise explosive environment be sensed, there is no possibility that short circuits or other electrical malfunctions could create an explosion. Additionally, the sensor system of the present invention could be incorporated into areas that have strong electromagnetic interference or areas that are strongly susceptible to such electromagnetic interference. Since the sensor 14 is a totally passive device, and since no electricity passes through the optical fiber, the present invention is particularly useful in such application.

The use of the beamsplitter-type coupler is very important and advantageous to the present invention. This optical coupler permits a single optical pathway to be used for the transmission of light information to and from the temperature/pressure sensor. This eliminates the problems inherent in the complicated bundle-type arrangements of optical fibers, as used in the prior art. The single optical fiber can be incorporated simply and easily within the temperature/pressure sensor. Since the integrity of only one fiber must be maintained, the failure rates are reduced and repair is minimized. In addition, the single fiber arrangement reduces the cost of the optical fibers within the system. These are but a few of the many advantages that are achieved through the single fiber-beamsplitter arrangement of the present invention.

The foregoing disclosure and description of the invention is illustrative and explanatory thereof, and various changes in the size, shape, and materials, as well as in the details of the illustrated construction, may be made within the scope of th appended claims without departing from the spirit of the invention. This invention should only be limited by the appended claims and their legal equivalents.

I claim:
1. A fiberoptic pressure sensing system comprising:
a light source means;
sensor means responsive to an external stimulus, said sensor means being a pressure sensor comprising:
a body having a cylindrical cavity opening at one end of said body:
a carrier element arranged within said body, said carrier element having a reflective surface affixed thereto:
a pressure responsive member connected to said carrier element and movable within said body, said pressure responsive member being a piston disposed within said cavity, said piston arranged so as to move longitudinally within said body in response to pressure acting on said piston: and
a belleville spring removably disposed within said body and juxtaposed against one end of said piston, said belleville spring positioned so as to exert a desired amount of resistance against the longitudinal movement of said piston:
fiberoptic means for transmitting light from said light source means to said pressure sensor, said reflective surface for reflecting light from said fiberoptic means, said reflective surface movable relative to said fiberoptic means;
detector means arranged so as to receive light reflected by said reflective surface said detector means being responsive to the power of said reflected light; and
output means electrically connected to said detector means for producing a signal relative to the pressure acting on said piston.

2. The apparatus of claim 1, said pressure sensor further comprising:
fiberoptic correction means fastened to one end of said body, said fiberoptic connection means arranged such that the end face of an optical fiber passing therethrough is parallel to said reflective surface.

3. A fiberoptic pressure sensor comprising:
a body, said body having a cylindrical cavity at one end of said body;
a carrier element contained within said body, said carrier element having a reflective surface affixed thereto;
a pressure responsive member connected to said carrier and movable within said body in response to pressure acting on said pressure sensitive member, said pressure sensitive member comprising a piston disposed within said cavity, said piston arranged so as to move longitudinally with respect to said body in response to pressure acting on said piston;
a belleville spring disposed within said body and juxtaposed against one end of said piston, said belleville spring positioned so as to exert a desired amount of resistance against the longitudinal movement of said piston; and
fiberoptic connection means arranged about one end of said body for positioning an optical fiber such that the end face of the optic fiber is parallel to the reflective surface within said body.

* * * * *